US006291061B1

(12) United States Patent
LeMay et al.

(10) Patent No.: US 6,291,061 B1
(45) Date of Patent: Sep. 18, 2001

(54) HYDROGEN GETTERING PACKING MATERIAL, AND PROCESS FOR MAKING SAME

(75) Inventors: James D. LeMay, Castro Valley, CA (US); Lisa M. Thompson, Knoxville, TN (US); Henry Michael Smith, Overland Park, KS (US); James R. Schicker, Lee's Summit, MO (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/392,658

(22) Filed: Sep. 9, 1999

(51) Int. Cl.[7] ...................... B32B 27/00

(52) U.S. Cl. ...................... 428/319.3; 428/319.7; 428/312.6

(58) Field of Search ...................... 428/312.6, 319.3, 428/319.7

(56) References Cited

U.S. PATENT DOCUMENTS

| | | | |
|---|---|---|---|
| 3,238,157 | 3/1966 | Smith | 260/2.5 |
| 3,896,042 | 7/1975 | Anderson et al. | 252/184 |
| 3,963,826 | 6/1976 | Anderson et al. | 423/248 |
| 4,405,487 | 9/1983 | Harrah et al. | 252/194 |
| 4,557,379 * | 12/1985 | Lane et al. | 206/328 |
| 5,591,379 * | 1/1997 | Shores | 252/194 |
| 5,624,598 | 4/1997 | Shepodd et al. | 252/182.12 |
| 5,703,378 | 12/1997 | Shepodd et al. | 252/182.12 |
| 5,837,158 | 11/1998 | Shepodd et al. | 252/181.6 |
| 5,888,925 * | 3/1999 | Smith et al. | 502/400 |
| 5,998,325 * | 12/1999 | Shepodd | 502/151 |
| 6,110,397 * | 8/2000 | Shepodd et al. | 252/181.6 |
| 6,110,808 * | 8/2000 | Saito | 438/471 |
| 6,121,648 * | 9/2000 | Evans, Jr. | 257/295 |

OTHER PUBLICATIONS

Smith, Mike H., et al., "KCD Getters" (Viewgraphs), Allied Signal Aero–space, Kansas City Division, Kansas City, KS, Aug. 23, 1994, pp. 1–9.

* cited by examiner

*Primary Examiner*—Blaine Copenheaver
*Assistant Examiner*—Leanna Roché
(74) *Attorney, Agent, or Firm*—William C. Daubenspeck; Julia C. Moody; Virginia B. Caress

(57) ABSTRACT

A hydrogen gettering system for a sealed container is disclosed comprising packing material for use within the sealed container, and a coating film containing hydrogen gettering material on at least a portion of the surface of such packing material. The coating film containing the hydrogen gettering material comprises a mixture of one or more organic materials capable of reacting with hydrogen and one or more catalysts capable of catalyzing the reaction of hydrogen with such one or more organic materials. The mixture of one or more organic materials capable of reacting with hydrogen and the one or more catalysts is dispersed in a suitable carrier which preferably is a curable film-forming material. In a preferred embodiment, the packing material comprises a foam material which is compatible with the coating film containing hydrogen gettering material thereon.

19 Claims, 2 Drawing Sheets

HYDROGEN GETTERING PACKING MATERIAL, AND PROCESS FOR MAKING SAME

The United States Government has rights in this invention pursuant to Contract No. W-7405-ENG48 between the United States Department of Energy and the University of California for management of the Lawrence Livermore National Laboratory.

BACKGROUND OF THE INVENTION

This invention relates to the gettering of hydrogen. More particularly, this invention relates to the provision of a hydrogen getter material on a surface of packing material such as a foam pad to provide both mechanical support and protection against hydrogen gas for hydrogen sensitive apparatus positioned and mechanically supported in a container by the foam pad.

The accumulation of hydrogen in a confined space such as a hermetically sealed container is undesirable. When the sealed container contains exposed electronics, any hydrogen present in the container, for example, from an improperly cured potting material, may have a deleterious effect on the exposed electronics. The present of hydrogen may also constitute an explosion hazard or a source of corrosion for heavy metals also contained in the sealed container.

It is well known in the art that hydrogen may be removed from a container using materials known as getters that either absorb or react with hydrogen. For example, Anderson et al. U.S. Pat. No. 3,896,042 (and its division Anderson et al. U.S. Pat. No. 3,963,826) discloses the formation of a hydrogen getter by coating a hydrogenation catalyst such as platinum or palladium with an active unsaturated organic material. Harrah et al. U.S. Pat. No. 4,405,487 describes a combination moisture and hydrogen getter composition comprising a moisture getter such as an oxidizable metal, and a hydrogen getter comprising a solid acetylenic compound and a hydrogenation catalyst. Shepodd et al. U.S. Pat. Nos. 5,624,598 and 5,703,378 describe hydrogen gettering compositions comprising organic compounds containing double or triple bonds and a hydrogenation catalyst for catalyzing the reaction between the organic compound and hydrogen, while Shepodd et al. U.S. Pat. No. 5,837,158 discloses a hydrogen gettering composition comprising organic polymers having carbon-carbon double bonds throughout the structure, a noble metal hydrogenation catalyst such as a platinum or palladium catalyst, and an inert catalyst support material such as carbon.

While such getter compositions are capable of removing undesirable hydrogen from a sealed container, there are problems associated with the use of such getters. For example, the physical disposition of the getter material within the sealed container may be as a loose solid, pressed pellets, or as a coating applied to interior surfaces of the sealed container. If the getter material is present as a loose solid, its presence and mobility may interfere with the operation of the contents of the sealed container, and the ability of the loose getter material to shift positions in the sealed container may interfere with a desired uniformity or homogeneity of the distribution of the getter material throughout the volume of the sealed container. If the getter material is present as pressed pellets, it may not be possible to place it in close proximity to the hydrogen source. On the other hand, if the getter is applied as a coating to an interior surface of the sealed container, the problem of uniformity of distribution is solved, but the adherence of the coating material to the surface of the container may be less than satisfactory depending upon the type of material constituting the sealed container. Furthermore, removal of the coating material from the surfaces of the container, for example, to permit replacement, or analysis of the getter material for its efficacy in removal of hydrogen, may be difficult when the getter material has been applied to the container surfaces, for example, as a coating.

Sealed containers containing apparatus are also conventionally provided with packing materials which serve to prevent or inhibit movement of the apparatus within the sealed container to thereby reduce problems of breakage or other damage to the apparatus within the sealed container. While such packing materials are advantageously chosen to have low, if any, emission of hydrogen, their presence in the sealed container may further impede the uniform positioning or locating of hydrogen gettering material within the sealed container.

It would, therefore, be desirable to provide a sealed container with a hydrogen gettering system wherein the hydrogen getter material is capable of being maintained uniformly distributed throughout the sealed container with movement of the getter material within the sealed container restrained, and capable of being placed in close proximity to the hydrogen source, while still permitting easy removal of the getter material from the container when desired.

SUMMARY OF THE INVENTION

In accordance with the invention, a hydrogen gettering system for a sealed container is provided comprising packing material for use within the sealed container, and a coating film containing hydrogen gettering material on at least a portion of the surface of such packing material. The hydrogen gettering material comprises a mixture of one or more organic materials capable of reacting with hydrogen and one or more catalysts capable of catalyzing the reaction of hydrogen with such one or more organic materials, with the mixture dispersed in a suitable carrier which preferably is a curable film-forming material. In a preferred embodiment, the packing material comprises a foam material which is compatible with the constituents of the coating film thereon, including the hydrogen gettering material.

DETAILED DESCRIPTION OF THE INVENTION

Figure 1:
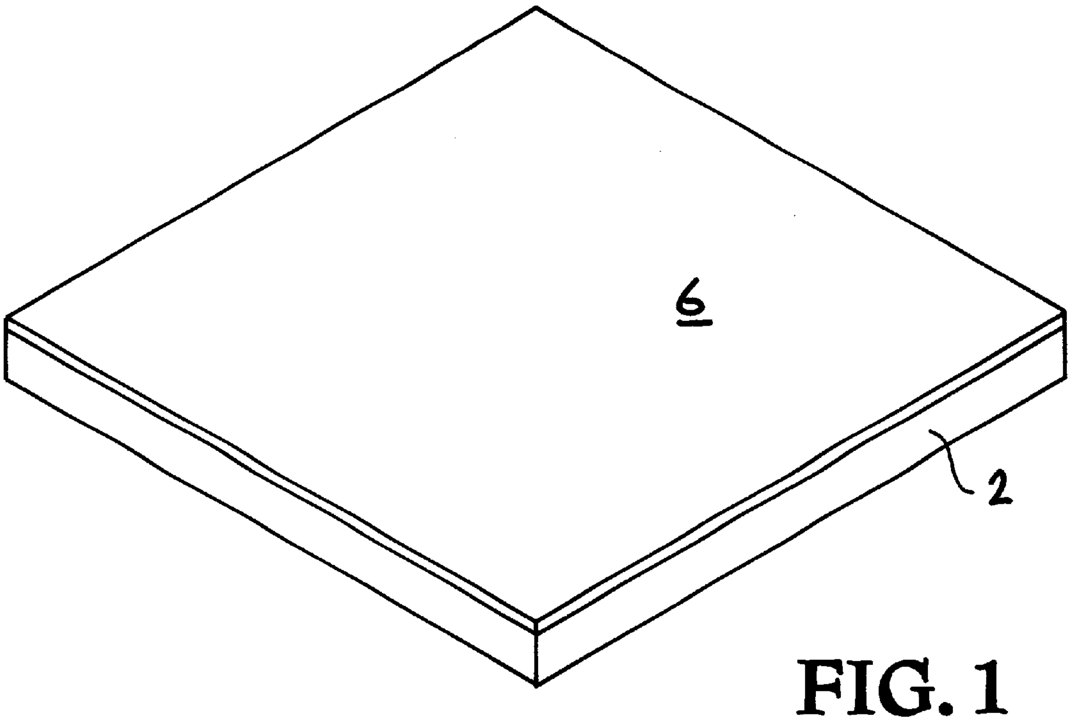
FIG. 1 is an isometric view of the invention showing a foam packing material coated on one surface with a layer of hydrogen gettering material as a continuous film.

The invention comprises a hydrogen gettering system for a sealed container which includes packing material for use in the sealed container, and a coating film-containing hydrogen gettering material on at least a portion of the surface of such packing material. The hydrogen gettering material comprises a mixture of one or more organic materials capable of reacting with hydrogen and one or more catalysts capable of catalyzing the reaction of hydrogen with such one or more organic materials, with the mixture dispersed in a suitable carrier which preferably is a curable film-forming material.

While the packing material which is coated with the film containing the hydrogen gettering material may comprise any type of packing material capable of inhibiting the shifting of apparatus placed within the sealed container, the packing material must be compatible with the film coated thereon containing the hydrogen gettering material. The packing material may be a compressible paper product such as, for example, cardboard. However, in a preferred embodiment, the packing material comprises a foam material which is compatible with the film coating thereon containing the hydrogen gettering material.

By use of the term "compatible" herein with respect to the packing material and the film coating containing the hydrogen gettering material is meant that the coating film containing the hydrogen gettering material is capable of being adhered to the surface of the packing material without interacting (chemically or physically) with the packing material in any manner which would impede the function of either the hydrogen gettering material or the packing material for their respective intended purposes. For example, the packing material should be selected to be a material which will not interfere with the ability of the hydrogen gettering material to react with any hydrogen in the sealed container, while the hydrogen gettering material (and any materials used therewith to form the coating film and to adhere the coating film containing the hydrogen gettering material to the packing material) should not interfere with the mechanical properties of the packing material, such as the strength or the flexibility of the packing material.

Any commercially available foam packing material possessing the requisite physical properties of a packing material may be used in accordance with the invention providing that it does not emit hydrogen gas (in any amounts which would prevent the hydrogen gettering material from carrying out its function within the sealed container), and that it does not interact with the hydrogen gettering material in any manner which would impede the function of either the hydrogen gettering material (and/or the coating film in which it is dispersed) or the packing material for their respective intended purposes.

In a particularly preferred embodiment, the foam packing material will comprise a silicone foam, i.e., a foamed siloxane polymer, such as described more fully in Smith U.S. Pat. No. 3,238,157, entitled "Method for Making a Filled Cellular Silicone Elastomer and Cellular Silicone Product Obtained Thereby", the incorporation of which by reference is hereby made. Either a closed or open cell foam packing material may be used, although a open cell foam may be preferred to facilitate transport of the hydrogen to the getter material and/or adherence of the hydrogen gettering material to the foam packing material. Examples of other foam packing materials which could be used in the invention include polyurethane foam, polyolefin foam, polystyrene foam, or expanded bead foams. While any convenient thickness of the foam packing material may be used which will permit its use as a satisfactory packing material, preferably the thickness will range from about 0.5 millimeters (~20 mils) to about 12.5 millimeters (~500 mils).

The organic getter material used to remove the hydrogen may comprise any organic material capable of reacting with hydrogen, provided that the reaction between the organic getter material and hydrogen does not result in the release of any reaction byproducts which would result in poisoning of the catalyst used with the getter material (as will be described below), or in any other way interfere with further reaction between the organic gettering material and hydrogen. Preferably, the reaction of the hydrogen with the organic getter material should be irreversible, e.g., release of hydrogen should not occur upon subsequent heating of the organic getter material as in an adsorption of the hydrogen onto a surface. Typically, the organic getter material for hydrogen will comprise an organic material having double bond (—C═C—) and/or triple bond (—C≡C—) moieties. Examples of such organic getter materials for hydrogen include 1,4-bis(phenylethynyl)benzene (DEB), 1,4-diphenylbutadiyne (DPB), 1,6-diphen-oxy-2,4-hexadiyne (DPPE), and 1,4-bis(1-hydroxycyclopentyl)butadiyne (HCPB). Other suitable organic getter materials for hydrogen include the hydrogen getter materials described in Anderson et al. U.S. Pat. Nos. 3,896,042 and 3,963,826; Harrah et al. U.S. Pat. No. 4,405,487; and Shepodd et al. U.S. Pat. Nos. 5,624,598; 5,703,378; and 5,837,158; the disclosures of each of which are hereby incorporated by reference. Mixtures of two or more of such hydrogen gettering materials may be used if desired.

The organic getter material for hydrogen is preferably used in combination with one or more catalysts which will catalyze the reaction between the organic getter material and hydrogen. Any material capable of catalyzing the reaction of the organic getter material with hydrogen may be used. Preferably, however, the catalyst material will comprise a platinum and/or palladium-containing catalyst either of which may be on a carbon support or any other suitably inert support. Further examples of suitable catalysts may be found in previously cited Anderson et al. U.S. Pat. No. 3,963,826.

The organic getter material and the catalyst material are used together in a ratio which may range from about 70 to about 99 wt. % organic getter material and from about 1 to about 30 wt. % catalyst. Preferably, the ratio ranges from about 70 to about 80 wt. % organic getter material and from about 20 to about 30 wt. % catalyst. Typically, the ratio of organic getter material to catalyst is about 75:25 wt. %.

The organic getter material and the catalyst material are both preferably provided in particulate form to permit the dispersion of the particulate mixture of organic getter material and catalyst material in a carrier which will facilitate application and bonding to the foam packing material of a film containing the organic getter material and catalyst. The carrier may comprise any film-forming material which is compatible with the organic getter material and catalyst and, in particular, which will not react in any way with the foam packing material or the organic getter material to form byproducts which would poison the catalyst. Preferably, the carrier comprises a curable material which is capable of bonding to the foam packing material.

The carrier, after application to the foam packing material, and after any drying or curing, must further be capable of penetration by hydrogen to permit access of the hydrogen to the organic getter material in the film formed by the dried and/or cured carrier. While the carrier may comprise a thermoplastic material, or an already partially or fully cured thermosetting material, preferably the carrier material will comprise an uncured thermosetting material to facilitate bonding to the foam packing material of the getter/catalyst and carrier film which will be formed thereon as will be described below.

An example of a suitable carrier material is a room temperature vulcanized (RTV) polysiloxane elastomer such as commercially available from General Electric Company under the trademark GE-615, a 2-part RTV. Examples of other suitable carriers include Sylgard silicone resin encapsulants available from Dow Corning, as well as silicones available from Rhône-Poulenc and Wacker Silicones Corp.

The getter/catalyst mixture is dispersed in the carrier in an amount ranging from about 10 wt. % to about 50 wt. % of the total weight of getter/catalyst and carrier, and preferably from about 30 wt. % to about 40 wt. % of the total weight of getter/catalyst and carrier. Amounts of getter/catalyst mixture less than about 10 wt. % of the total weight of getter/catalyst and carrier may provide an ineffective amount of gettering material in the film, while an amount of getter/catalyst mixture exceeding 50 wt. % of the total weight of getter/catalyst and carrier may be difficult to process as the mixture can become too viscous to permit effective distribution of the getter solids into the liquid carrier.

The thickness of the getter/catalyst and carrier film may range from about 2.5 micrometers (0.1 mils) to about 125 micrometers (5 mils) and preferably will range from about 12.7 micrometers (0.5 mils) to about 75 micrometers (3 mils). The minimum thickness of the getter/catalyst and carrier film will be controlled by the physical properties of the dispersion such as the viscosity, etc. The maximum thickness will depend upon the desired chemical margin, the engineering properties of the composite, and the ability of the hydrogen to penetrate into the film to reach the getter material. The use of film thicknesses beyond the maximum thickness which the hydrogen can penetrate to reach the getter material will not increase the getter capacity, but can be used if desired. It should be noted that while formation and use of a continuous film of the getter/catalyst and carrier is preferred, as shown in FIG. 1 (to provide maximum reactive surface area and to control the thickness of the film, as well as to facilitate subsequent removal of the film, if desired), it is within the scope of the invention to provide a pattern of discreet film areas such as the circles of getter/catalyst and carrier film shown in FIG. 2.

Figure 2:
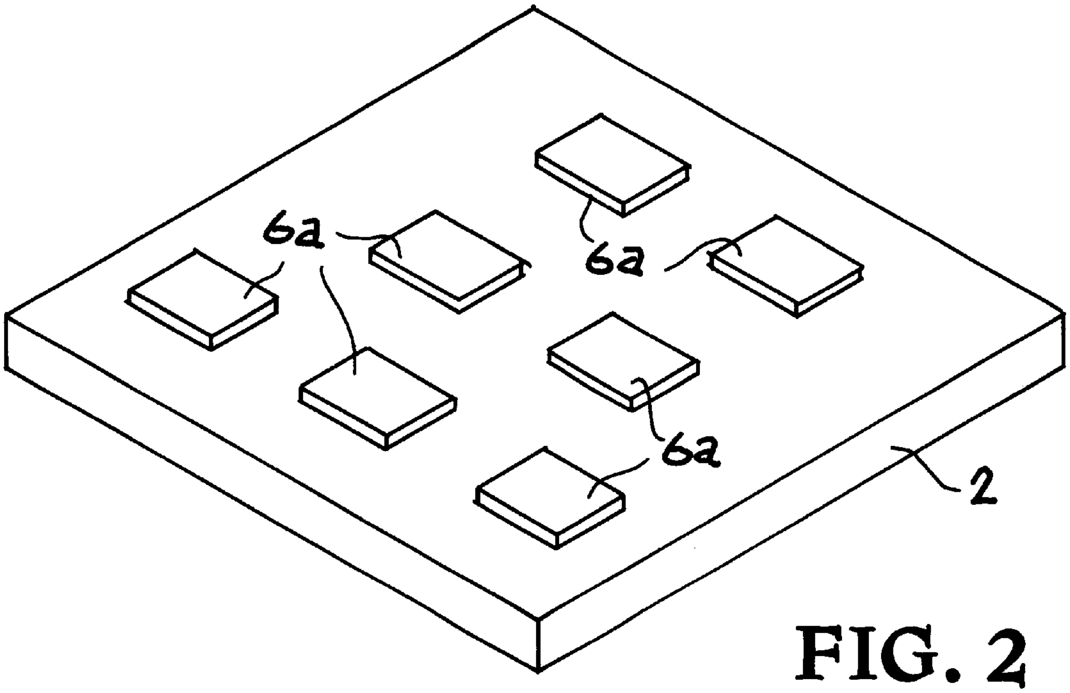
FIG. 2 is an isometric view of another embodiment of the invention showing a foam packing material having hydrogen gettering material applied to one surface of the packing material in a discreet pattern.

Thus, as shown in FIG. 1, a continuous film of getter/catalyst and carrier 6 may be formed on one or more surfaces of foam packing material 2. Alternatively, as shown in FIG. 2, a series of discreet areas of getter/catalyst and carrier film 6*a* may be formed on one or more surfaces of foam packing material 2.

Figure 3:
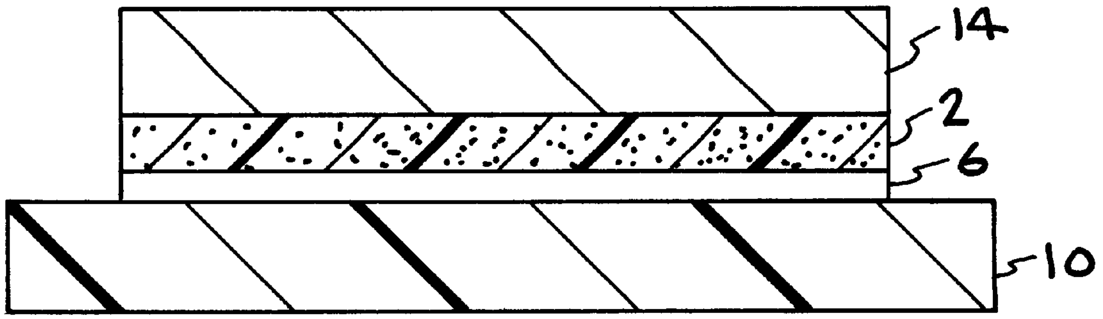
FIG. 3 is a vertical side section view showing a particular method for forming the getter material on the foam packing material.

While the getter/catalyst and carrier dispersion can be directly applied to the foam packing pad and then cured thereon, it is preferable to initially apply the getter/catalyst and carrier dispersion 6 to a releasable surface, such as teflon-coated base 10 shown in FIG. 3, using, for example, a doctor blade to control the thickness of the resulting getter/catalyst and carrier film. A sheet of foam packing material 2 is then applied directly over getter/catalyst and carrier dispersion 6, if the carrier being used comprises a curable material which has not already been at least partially cured. Sufficient pressure is then applied, for example, by weight 14, while the carrier material cures to form a bond between the getter/catalyst and carrier film and the foam packing material. Typically pressure ranging from about 5 psi to about 15 psi is applied to the foam packing material during curing or drying of adhesive.

Weight 14 is then removed and the resulting coated foam packing material is then stripped from the releasable surface. When the carrier used is not a curable material, or has already been at least partially cured before application to the foam packing material, a suitable adhesive, such as a silicon adhesive or an epoxy adhesive, may be used to bond the getter/catalyst and carrier film to the foam packing material, in which case suitable pressure is applied to the foam packing material, e.g., by weight 14, until the adhesive cures to bond the getter/catalyst and carrier film to the foam packing material.

Figure 4:
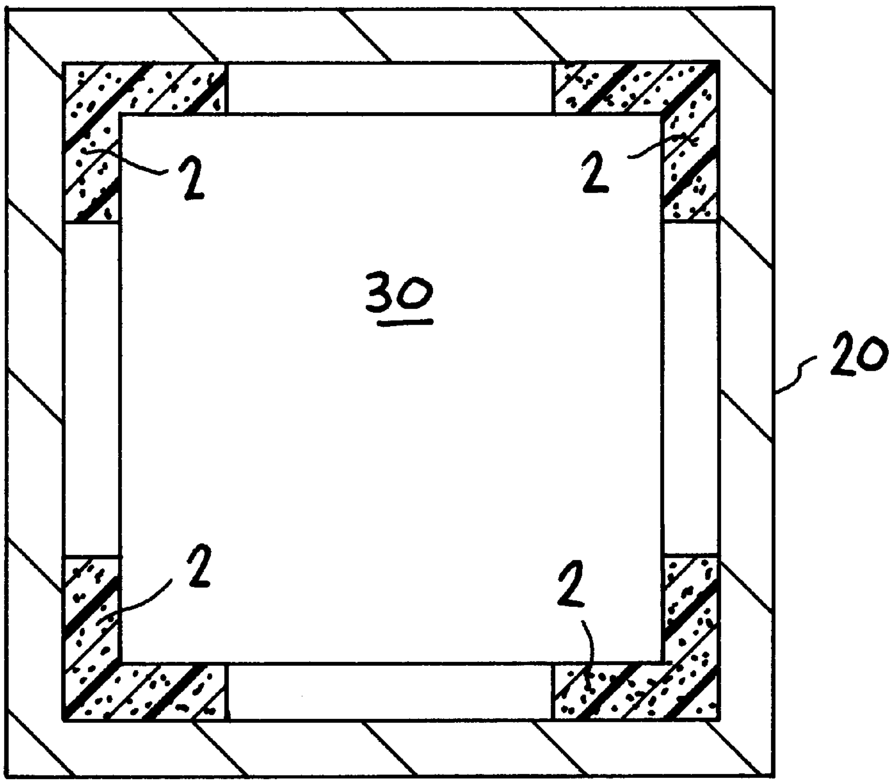
FIG. 4 is a top section view showing the foam packing material, previously coated with the hydrogen gettering material, positioned around an apparatus mounted in a sealed container.

If desired, heat may be applied to the coated foam packing material during the curing of the carrier or adhesive to facilitate the curing process. Such heat may range from just above room temperature, e.g., from about 30° C., up to a temperature just below the melting point of any of the constituents of the coated foam packing material, such as the getter material which may have a melting point below 190° C. It should be note that the use of heat to accelerate the curing of the carrier or adhesive thereon may be particularly useful when an open cell foam packing material is used to thereby prevent or inhibit penetration of the carrier or adhesive into the open cell foam packing material prior to curing of the carrier or adhesive by accelerating the curing, since such penetration may have a detrimental effect on the subsequent flexibility of the foam packing material The coated foam packing material may then be placed around the apparatus to be packed in the sealed container. This is illustrated in FIG. 4 wherein a sealable container 20 is shown having an apparatus 30 mounted therein with foam packing material 2, previously coated, in accordance with the invention, with a film of hydrogen getter/catalyst and carrier thereon (not shown), placed between container 20 and apparatus 30. The foam packing material coated with the film of hydrogen getter/catalyst and carrier functions to both restrain movement of the apparatus in the container as well as to provide evenly dispersed hydrogen getter material in the container whereby hydrogen in the sealed container may be more efficiently gettered.

To further illustrate the invention, a particulate mixture was formed comprising 75 wt. % 1,4-bis(phenylethynyl) benzene (DEB) hydrogen getter, and 25 wt. % of a hydrogenation catalyst comprising palladium supported on activated charcoal. This particulate mixture was mixed with a curable 2 part GE-615 silicone resin in a ratio of 40 wt. % particulate mixture and 60 wt. % silicon resin. The dispersion was then applied to a teflon coated steel plate with a doctor blade to provide a film thickness of about 0.38 millimeters (mm). A 1 mm thick sheet of silicone foam (made in accordance with U.S. Pat. No. 3,238,157) was then placed over the film and a pressure of about 5 psi was applied to the film, using an expandable air bladder.

The steel block was then heated to a temperature of 90° C. for a period of about 240 minutes until the GE-615 silicone resin was cured. The resulting coated silicone foam sheet was then peeled off the teflon coated steel block and examined for flexibility, compressibility, and overall strength compared to a similar sheet of uncoated silicone foam of the same thickness. The coated silicone foam sheet appeared to have similar physical properties to the uncoated sheet.

The coated sheet was then placed into a sealed container with a known amount volume. The container was pressurized to a measured pressure with hydrogen gas. After 24 hours of exposure to hydrogen in the sealed container, the hydrogen pressure remaining in the container was measured. With the mass of the getter coating known on the coated sheet and by using universal gas law equations, it was determined that the getter coated silicone foam sheet reacted to 90% or greater of its theoretical hydrogen capacity.

The coated silicone foam sheet was then used as a packing material for an apparatus in a sealed container. The coated silicone sheet was found to perform satisfactorily as packing material thus permitting it to be uniformly dispersed in the sealed container around the apparatus to provide both mechanical stability as well as uniform dispersion and distribution of the gettering material in the sealed container. Thus, the invention provides a hydrogen gettering structure and packing material system wherein the foam and getter/carrier can be tailored by the design engineer to fit particular needs. While the invention has been described with respect to the use of the packing material/getter structure in a sealed or confined container, it should be noted that it could be also used to protect hydrogen sensitive materials in an open environment, e.g., for protection from atmospheric hydrogen in, for example, an industrial environment.

While specific embodiments of the hydrogen gettering foam packing material of the invention and method of making same have been illustrated and described, modifications and changes of the apparatus, parameters, materials, etc. will become apparent to those skilled in the art, and it is intended to cover in the appended claims all such modifications and changes which come within the scope of the invention.

What is claimed is:

1. A packing material hydrogen getterer adapted for a container, comprising a removable, foam packing material which is compatible with a coating film placed on at least a portion of the surface of said foam packing material, wherein said coating film further comprises a hydrogen gettering material, comprising:

a) a mixture of one or more organic materials capable of reacting with hydrogen;

b) one or more catalysts capable of catalyzing a reaction of hydrogen with said one or more organic materials; and c) a carrier capable of forming a film.

2. The hydrogen gettering structure of claim 1 wherein said one or more organic materials and said one or more catalysts are present in said coating film in a ratio ranging from about 70 wt % to 99 wt. % of said one or more organic materials and from about 1 wt. % to about 30 wt. % of said one or more catalysts.

3. The hydrogen gettering structure of claim 1 wherein said one or more organic materials capable of reacting with hydrogen contain one or more —C═C— moieties.

4. The hydrogen gettering structure of claim 1, wherein said one or more organic materials capable of reacting with hydrogen contain one or more —C≡C— moieties.

5. The hydrogen gettering structure of claim 1 wherein said one or more catalysts capable of catalyzing a reaction of hydrogen with said one or more organic materials capable of reacting with hydrogen are selected from the group consisting of a platinum-containing catalyst, a palladium-containing catalyst, and mixtures thereof.

6. The hydrogen gettering structure of claim 1 wherein said carrier is a cured film-forming material.

7. The hydrogen gettering structure of claim 1 wherein said carrier is a cured polysiloxane material.

8. The packing material hydrogen getterer of claim 1, wherein said container is sealed.

9. The hydrogen gettering structure of claim 8 wherein said foam packing material comprises a foamed siloxane polymer.

10. The hydrogen gettering structure of claim 8 wherein said one or more organic materials and said one or more catalysts are present in said coating film in a ratio ranging from about 70 wt. % to 99 wt. % of said one or more organic materials and from about 1 wt. % to about 30 wt. % of said one or more catalysts.

11. The hydrogen gettering structure of claim 8 wherein said one or more organic materials and said one or more catalysts are present in said coating film in a ratio ranging from about 70 wt. % to 80 wt. % of said one or more organic materials and from about 20 wt. % to about 30 wt. % of said one or more catalysts.

12. The hydrogen gettering structure of claim 8 wherein said one or more organic materials capable of reacting with hydrogen contain or more moieties selected from the group consisting of one or more —C═C— moieties, one or more —C≡C— moieties, and mixtures thereof.

13. The hydrogen gettering structure of claim 8 wherein said one or more catalysts capable of catalyzing a reaction of hydrogen with said one or more organic materials capable of reacting with hydrogen are selected from the group consisting of a platinum-containing catalyst, a palladium-containing catalyst, and mixtures thereof.

14. The hydrogen gettering structure of claim 8 wherein said carrier is a cured polysiloxane material.

15. The packing material hydrogen getterer of claim 8 wherein the amount of said carrier in said coating film on said packing material ranges from about 10 wt. % to about 50 wt. % of the total weight of said organic material, catalyst, and carrier material in said coating film.

16. A hydrogen gettering structure for a sealed container comprising:

a) a foam packing material; and b) a coating film on at least a portion of the surface of said packing material comprising:

i) one or more organic materials capable of reacting with hydrogen, each containing one or more moieties selected from the group consisting of —C═C— moieties, —C≡C— moieties, and mixtures thereof;

ii) one or more catalysts capable of catalyzing a reaction of hydrogen with said one or more organic materials, said one or more catalysts selected from the group consisting of a platinum-containing catalyst, a palladium-containing catalyst, and mixtures thereof; and iii) a curable carrier capable of forming a film upon curing.

17. The hydrogen gettering structure of claim 16 wherein said foam packing material comprises a foamed siloxane polymer.

18. The hydrogen gettering structure of claim 16 wherein said carrier is a cured polysiloxane material.

19. A process for forming a hydrogen gettering structure for a sealed container comprising a removable, foam packing material and a coating film comprising hydrogen gettering material on at least a portion of the surface of said packing material comprising the steps of:

a) forming a coating composition comprising:

i) a mixture of one or more organic materials capable of reacting with hydrogen;

ii) one or more catalysts capable of catalyzing a reaction of hydrogen with said one or more organic materials; and iii) a carrier capable of forming a film, and b) adhering said coating composition to a surface of said packing material.

* * * * *